(12) United States Patent
Fang et al.

(10) Patent No.: US 11,397,348 B2
(45) Date of Patent: Jul. 26, 2022

(54) ARRAY SUBSTRATE HAVING CONVEX COMPONENT, METHOD FOR FABRICATING THE SAME, LIQUID CRYSTAL DISPLAY PANEL, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Haobo Fang, Beijing (CN); Yanna Xue, Beijing (CN); Zhiying Bao, Beijing (CN); Yong Zhang, Beijing (CN); Lei Mi, Beijing (CN); Lu Bai, Beijing (CN); Gang Hua, Beijing (CN); Jingpeng Wang, Beijing (CN); Lingxiang Yuan, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 508 days.

(21) Appl. No.: 16/300,255

(22) PCT Filed: Mar. 21, 2018

(86) PCT No.: PCT/CN2018/079887
§ 371 (c)(1),
(2) Date: Nov. 9, 2018

(87) PCT Pub. No.: WO2018/214628
PCT Pub. Date: Nov. 29, 2018

(65) Prior Publication Data
US 2019/0155099 A1 May 23, 2019

(30) Foreign Application Priority Data
May 23, 2017 (CN) .......................... 201710369924.2

(51) Int. Cl.
*G02F 1/1335* (2006.01)
*G02F 1/1368* (2006.01)
(Continued)

(52) U.S. Cl.
CPC ...... *G02F 1/133553* (2013.01); *G02F 1/1362* (2013.01); *G02F 1/1368* (2013.01);
(Continued)

(58) Field of Classification Search
CPC ............ G02F 1/1368; G02F 1/136209; G02F 1/1362; G02F 1/134309; G02F 1/133345;
(Continued)

(56) References Cited

U.S. PATENT DOCUMENTS

| 5,500,750 A | * | 3/1996 | Kanbe | ............... G02F 1/133512 349/42 |
| 5,734,455 A | | 3/1998 | Yoshida et al. | |

(Continued)

FOREIGN PATENT DOCUMENTS

| CN | 1118077 A | 3/1996 |
| CN | 101103302 A | 1/2008 |

(Continued)

OTHER PUBLICATIONS

Office Action for corresponding Chinese Application 201710369924.2 dated Feb. 22, 2019.
(Continued)

*Primary Examiner* — Stephen M Bradley
(74) *Attorney, Agent, or Firm* — ArentFox Schiff LLP; Michael Fainberg

(57) ABSTRACT

The disclosure discloses an array substrate, a method for fabricating the same, a liquid crystal display panel, and a display device, where the array substrate includes: a base substrate; a convex component located on the base substrate; a reflection layer overlying the convex component; a thin (Continued)

film transistor located above a film layer at which the reflection layer is located; a pixel electrode located above a film layer at which the thin film transistor is located; and a planarization layer located between the pixel electrode and the reflection layer.

17 Claims, 2 Drawing Sheets

(51) Int. Cl.
  *G02F 1/1333* (2006.01)
  *G02F 1/1343* (2006.01)
  *G02F 1/1362* (2006.01)
(52) U.S. Cl.
  CPC .. *G02F 1/133345* (2013.01); *G02F 1/134309* (2013.01); *G02F 1/136209* (2013.01); *G02F 1/13356* (2021.01); *G02F 1/133357* (2021.01); *G02F 1/136236* (2021.01); *G02F 2201/123* (2013.01); *G02F 2203/02* (2013.01)
(58) Field of Classification Search
  CPC ........... G02F 1/133553; G02F 2203/02; H01L 27/124; H01L 27/3244
  See application file for complete search history.

(56) References Cited

U.S. PATENT DOCUMENTS

| | | | | | |
|---|---|---|---|---|---|
| 5,940,154 | A * | 8/1999 | Ukita | .............. | G02F 1/133553 349/113 |
| 6,208,395 | B1 * | 3/2001 | Kanoh | .............. | G02F 1/133553 349/41 |
| 6,341,002 | B1 * | 1/2002 | Shimizu | ............ | G02F 1/133504 349/119 |
| 6,407,784 | B1 * | 6/2002 | Kanou | .............. | G02F 1/133553 349/113 |
| 6,532,045 | B2 * | 3/2003 | Chung | .............. | G02F 1/133555 349/110 |
| 6,654,176 | B2 * | 11/2003 | Yoshikawa | .......... | G02B 3/0025 264/2.7 |
| 6,879,359 | B1 * | 4/2005 | Kikkawa | ........... | G02F 1/133553 349/110 |
| 6,881,535 | B2 * | 4/2005 | Yamaguchi | ....... | G02F 1/133553 430/319 |
| 6,900,084 | B1 * | 5/2005 | Yamazaki | ......... | G02F 1/133553 438/158 |
| 7,440,050 | B2 * | 10/2008 | Sumi | .................... | G02B 5/0221 349/113 |
| 7,705,945 | B2 * | 4/2010 | Kanou | .............. | G02F 1/133553 349/113 |
| 7,760,321 | B2 * | 7/2010 | Han | .................. | G02F 1/133553 349/114 |
| 8,035,781 | B2 * | 10/2011 | Eguchi | ............. | G02F 1/133555 349/113 |
| 2002/0054259 | A1 * | 5/2002 | Funahata | ............. | G02B 5/0215 349/113 |
| 2002/0118326 | A1 * | 8/2002 | Sakamoto | ......... | G02F 1/133553 349/113 |
| 2002/0196396 | A1 * | 12/2002 | Sakamoto | ......... | G02F 1/133553 349/113 |
| 2004/0070709 | A1 * | 4/2004 | Kanou | .............. | G02F 1/136227 349/113 |
| 2004/0119901 | A1 * | 6/2004 | Kang | ................ | G02F 1/133512 349/43 |
| 2004/0135944 | A1 | 7/2004 | Kim | | |
| 2005/0083454 | A1 * | 4/2005 | Sumi | ................ | G02F 1/133553 349/113 |
| 2005/0083461 | A1 * | 4/2005 | Yang | ................ | G02F 1/133555 349/114 |
| 2005/0094070 | A1 * | 5/2005 | Lai | ..................... | G02F 1/136209 349/122 |
| 2007/0263288 | A1 * | 11/2007 | Tsubota | ............ | G02F 1/133553 359/599 |
| 2016/0035807 | A1 * | 2/2016 | Shi | ..................... | H01L 51/0512 257/40 |
| 2016/0041414 | A1 * | 2/2016 | Shen | .................. | G02F 1/13439 257/72 |
| 2016/0349558 | A1 * | 12/2016 | Shishido | ............. | G02F 1/13338 |
| 2016/0358948 | A1 * | 12/2016 | Wang | .................. | H01L 27/124 |
| 2016/0365069 | A1 * | 12/2016 | Bao | .................. | H01L 31/022408 |
| 2017/0053608 | A1 * | 2/2017 | Li | ........................ | G09G 3/3674 |

FOREIGN PATENT DOCUMENTS

| | | |
|---|---|---|
| CN | 1246634 A | 3/2008 |
| CN | 107065328 A | 8/2017 |
| JP | 2004184565 A | 7/2004 |
| KR | 20080004989 A | 1/2008 |

OTHER PUBLICATIONS

International Search Report for PCT/CN2018/079887 dated Jun. 25, 2018.

* cited by examiner

ARRAY SUBSTRATE HAVING CONVEX COMPONENT, METHOD FOR FABRICATING THE SAME, LIQUID CRYSTAL DISPLAY PANEL, AND DISPLAY DEVICE

CROSS-REFERENCE TO RELATED APPLICATION

This application is a National Stage of International Application No. PCT/CN2018/079887, filed Mar. 21, 2018, which claims the benefit of Chinese Patent Application No. 201710369924.2, filed with the Chinese Patent Office on May 23, 2017, and entitled "A pixel structure, a display panel, a display device, and a method for fabricating a pixel structure", which are hereby incorporated by reference in their entireties.

TECHNICAL FIELD

This disclosure relates to the field of display technologies, and particularly to an array substrate, a method for fabricating the same, a liquid crystal display panel and a display device.

DESCRIPTION OF THE RELATED ART

A backlight source to be provided as a light source for a liquid crystal panel in the related art to display an image is a light source located behind a Liquid Crystal Display (LCD), and a light emitting effect thereof may pose a direct influence on a visual effect of a Liquid Crystal Module (LCM).

However there is considerable power consumption of the backlight source in the related art.

SUMMARY

Embodiments of the disclosure provide an array substrate including: a base substrate; a convex component located on the base substrate; a reflection layer overlying the convex component; a thin film transistor located above a film layer at which the reflection layer is located; a pixel electrode located above a film layer at which the thin film transistor is located; and a planarization layer located between the pixel electrode and the reflection layer.

Optionally in the array substrate above according to the embodiments of the disclosure, the planarization layer includes a gate insulation layer of the thin film transistor.

Optionally in the array substrate above according to the embodiments of the disclosure, the planarization layer further includes a first insulation layer located between the thin film transistor and the reflection layer.

Optionally in the array substrate above according to the embodiments of the disclosure, a material of the gate insulation layer is the same as a material of the first insulation layer.

Optionally in the array substrate above according to the embodiments of the disclosure, the thin film transistor is a thin film transistor with a bottom gate.

Optionally in the array substrate above according to the embodiments of the disclosure, an orthographic projection of the reflection layer onto the base substrate overlaps with an orthographic projection of the pixel electrode onto the base substrate.

Optionally in the array substrate above according to the embodiments of the disclosure, an orthographic projection of the convex component onto the base substrate does not overlap with an orthographic projection of the thin film transistor onto the base substrate.

Optionally in the array substrate above according to the embodiments of the disclosure, the convex component includes a plurality of layers of sub-convex component.

Optionally in the array substrate above according to the embodiments of the disclosure, a material of the convex component is a resin or a silicon nitride.

Optionally in the array substrate above according to the embodiments of the disclosure, the array substrate further includes a base layer located between the convex component and the base substrate.

In another aspect, the embodiments of the disclosure further provide a liquid crystal display panel including the array substrate above according to the embodiments of the disclosure.

In still another aspect, the embodiments of the disclosure further provide a display device including the liquid crystal display panel above according to the embodiments of the disclosure.

In yet another aspect, the embodiments of the disclosure further provide a method for fabricating the array substrate above, the method including: forming the convex component on the base substrate; forming the reflection layer above the convex component; forming the thin film transistor above the film layer at which the reflection layer is located; forming the pixel electrode above the film layer at which the thin film transistor is located; and forming the planarization layer after the reflection layer is formed, and before the pixel electrode is formed.

Optionally in the method above according to the embodiments of the disclosure, forming the planarization layer includes: forming a gate insulation layer of the thin film transistor.

Optionally in the method above according to the embodiments of the disclosure, forming the planarization layer further includes: forming a first insulation layer above the film layer at which the reflection layer is located.

Optionally in the method above according to the embodiments of the disclosure, forming the convex component on the base substrate includes: forming the convex component on the base substrate using a half-tone or gray tone mask.

Optionally in the method above according to the embodiments of the disclosure, the reflection layer and the pixel electrode are formed using the same mask.

DETAILED DESCRIPTION OF THE EMBODIMENTS

The technical solutions according to the embodiments of the disclosure will be described clearly and fully with reference to the drawings in the embodiments of the disclosure, and apparently the embodiments to be described are only a part but not all of the embodiments of the disclosure. Based upon the embodiments here of the disclosure, all the other embodiments which can occur to those ordinarily skilled in the art without any inventive effort shall fall into the scope of the disclosure.

Figure 1:
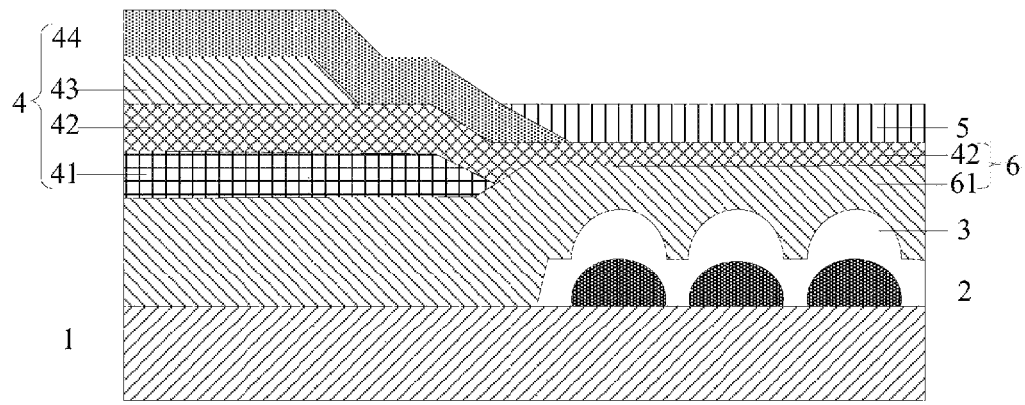
FIG. 1 is a schematic structural diagram of an array substrate according to embodiments of the disclosure in a sectional view.

Referring to FIG. 1, an array substrate according to the embodiments of the disclosure includes: a base substrate 1; a convex component 2 located on the base substrate 1; a reflection layer 3 overlying the convex component 2; a thin film transistor 4 located above a film layer at which the reflection layer 3 is located; a pixel electrode 5 located above a film layer at which the thin film transistor 4 is located; and a planarization layer 6 located between the pixel electrode 5 and the reflection layer 3.

Particularly, in the array substrate above according to the embodiments of the disclosure, the reflection layer 3 arranged between the pixel electrode 5 and the base substrate 1 can perform a function of reflecting light to thereby dispense with a backlight source so as to lower overall power consumption. Further, the convex component 2 arranged between the reflection layer 3 and the base substrate 1 can make a surface of the reflection layer 3 overlying the convex component 2 concavo-convex to thereby satisfy a diffuse reflection condition of light so as to improve a lateral angle of view. The planarization layer 6 located on the reflection layer 3 with the concavo-convex surface can enable a surface of the pixel electrode 5 thereon to be planar, and the planar surface of the pixel electrode 5 can facilitate the maintenance of a morphology of an electric field formed between the pixel electrode 5 and a common electrode, as compared with the related art in which a diffuse reflection function is achieved directly using a pixel electrode with a concavo-convex surface.

Particularly, in the array substrate above according to the embodiments of the disclosure, a material of the base substrate 1 will not be limited to any particular material, and for example, the base substrate is a glass substrate, or a substrate of another material, and a thickness thereof will not be limited to any particular thickness, but can be set as needed in reality.

Optionally, in the array substrate above according to the embodiments of the disclosure, a material of the convex component 2 includes silicon nitride or a resin material, but there are a lower cost of the silicon nitride, and a higher adhesion strength of the silicon nitride to the base substrate 1 than the resin material, so the convex component 2 can be made of the silicon nitride to thereby save a cost, and dispense with a planarization operation before the convex component 2 is fabricated.

Optionally, in the array substrate above according to the embodiments of the disclosure, a height of the convex component 2 will not be limited to any particular height, and for example, in order to enable the height of the convex component 2 to better satisfy the diffuse reflection condition of light, the height of the convex component 2 can be set in a range of 3000 to 4000 angstroms.

Optionally, in the array substrate above according to the embodiments of the disclosure, an orthographic projection of the convex component 2 onto the base substrate 1 does not overlap with an orthographic projection of the thin film transistor 4 onto the base substrate 1, that is, the convex component 2 is located in a valid display area of a pixel, and the thin film transistor 4 is located in a non-display area of the pixel. This design can avoid the concavo-convex convex component 2 from affecting the planarity and thus the performance of the thin film transistor 4. Further, the convex component 2 is located in the display area so that the reflection layer 3 overlying the convex component 2 has a concavo-convex surface in the display area to thereby satisfy the diffuse reflection condition of light so as to diffusely reflect light in the display area.

Figure 2:
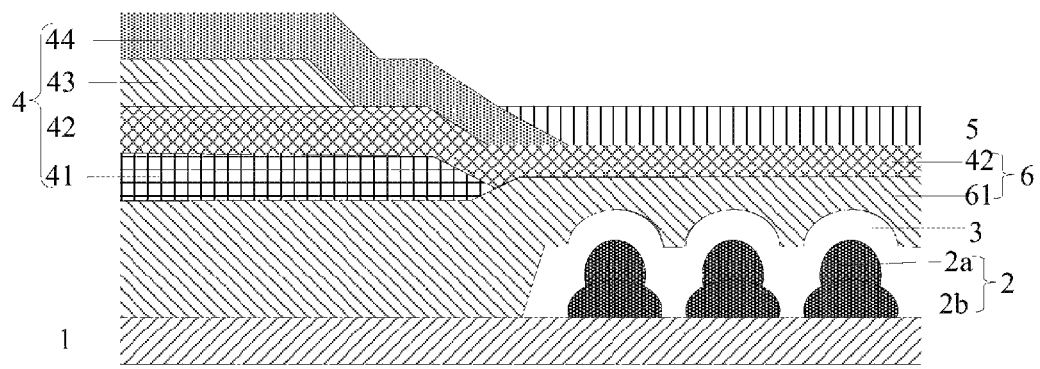
FIG. 2 is another schematic structural diagram of an array substrate according to the embodiments of the disclosure in a sectional view.

Optionally, in the array substrate above according to the embodiments of the disclosure, referring to FIG. 2, the convex component 2 includes a plurality of layers of sub-convex component, and for example, as illustrated in FIG. 2, each convex component includes a first layer of sub-convex component 2a and a second layer of sub-convex component 2b. The arrangement of the plurality of layers of sub-convex component can make the surface of the reflection layer 3 more concavo-convex to thereby better satisfy the diffuse reflection condition of light so that light rays can be better reflected diffusely to thereby further improve the lateral angle of view.

Figure 3:
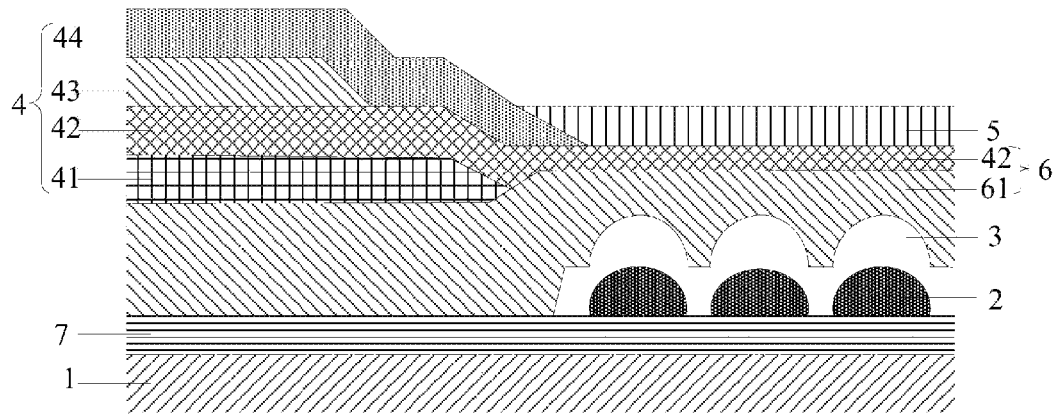
FIG. 3 is still another schematic structural diagram of an array substrate according to the embodiments of the disclosure in a sectional view.

Optionally, in the array substrate above according to the embodiments of the disclosure, referring to FIG. 3, the array substrate further includes a base layer 7 located between the convex component 2 and the base substrate 1, where the base layer 7 can improve the adhesion strength between the convex component 2 and the base substrate 1.

Optionally, in the array substrate above according to the embodiments of the disclosure, a material of the base layer 7 can be the same as the material of the convex component 2, and for example, both of them are silicon nitride. A thickness of the base layer will not be limited to any particular thickness, but can be set as needed in reality. Particularly, the base layer 7 can cover the entire base substrate 1 so that the base layer 7 not only can further flatten the film layer at which the convex component 2 is arranged, but also can further improve the adhesion strength between the convex component 2 and the base substrate 1 to thereby avoid the convex component 2 from falling away.

Figure 4:
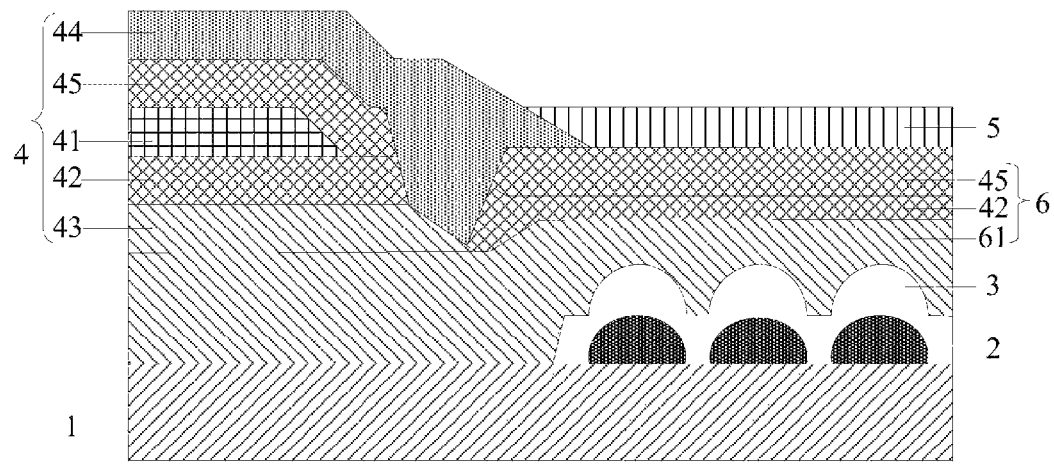
FIG. 4 is yet another schematic structural diagram of an array substrate according to the embodiments of the disclosure in a sectional view.

Particularly, in the array substrate above according to the embodiments of the disclosure, the thin film transistor 4 can be a thin film transistor with a top gate, or a thin film transistor with a bottom gate, although the embodiments of the disclosure will not be limited thereto. Here referring to FIG. 1, the thin film transistor 4 with the bottom gate includes a gate 41, a gate insulation layer 42, an active layer 43, and a source-drain electrode 44 arranged in a stack manner in that order. Referring to FIG. 4, the thin film transistor 4 with the top gate includes an active layer 43, a gate insulation layer 42, a gate 41, an insulation layer 45, and a source-drain electrode 44 arranged in a stack manner in that order.

Optionally, in the array substrate above according to the embodiments of the disclosure, referring to FIG. 1, when the thin film transistor 4 is the thin film transistor with the bottom gate, an orthographic projection of the reflection layer 3 onto the base substrate 1 can overlap with an orthographic projection of the pixel electrode 5 onto the base substrate 1, so that the reflection layer 3 and the pixel electrode 5 can be fabricated using the same mask to thereby save a fabrication cost.

Optionally, in the array substrate above according to the embodiments of the disclosure, referring FIG. 4, when the thin film transistor 4 is the thin film transistor with the top gate, the reflection layer 3 can extend to an area below the thin film transistor 4, and act as a light-shielding layer, so that the reflection layer 3 shields the active layer 43 to thereby avoid leakage current from affecting the display driving. It shall be noted that, here since the orthographic projection of the convex component 2 onto the base substrate 1 does not overlap with the orthographic projection of the thin film transistor 4 onto the base substrate 1, a surface of the reflection layer 3 below the thin film transistor 4 is so planar that the thin film transistor 4 located above will not be hindered from being fabricated.

Optionally, in the array substrate above according to the embodiments of the disclosure, a material of the reflection layer 3 can be a metal material, for example, or can be another material, or a mixture of both, where the metal material can be copper, iron, aluminum, a compound of a plurality of metal materials, etc. The reflection layer 3 can be a single layer of metal material, or a plurality of layers of metal materials.

Optionally, in the array substrate above according to the embodiments of the disclosure, referring to FIG. 1, the planarization layer 6 includes the gate insulation layer 42 of the thin film transistor 4.

Particularly, no matter whether the thin film transistor 4 is the thin film transistor with a top or bottom gate, the gate insulation layer 42 is arranged between the gate 41 and the active layer 43, and the gate insulation layer 42 can function for planarization. Further, in order to optimize the planarization function, the gate insulation layer 42 can be improved in thickness as appropriate, but the gate insulation layer 42 shall not be too thick; otherwise the on-voltage of the gate 41 may be affected that power consumption for driving may become higher.

Optionally, in the array substrate above according to the embodiments of the disclosure, referring to FIG. 1, the planarization layer 6 furthers include a first insulation layer 61 located between the thin film transistor 4 and the reflection layer 3.

Particularly, the first insulation layer 61 located between the thin film transistor 4 and the reflection layer 3 not only can function for a better planarization, but also can insulate the reflection layer 3 from the thin film transistor 4 so that a pattern of the reflection layer 3 can be arranged over an entire surface without being limited to a pattern of the thin film transistor 4. Further, the first insulation layer 61 can isolate signal interference between the reflection layer 3 and the thin film transistor 4 so that the pixel electrode 5 can be driven normally.

Particularly, a material of the first insulation layer 61 is silicon nitride or a resin, although the embodiments of the disclosure will not be limited thereto.

Optionally, in the array substrate above according to the embodiments of the disclosure, a material of the gate insulation layer 42 is the same as the material of the first insulation layer 61.

Optionally, in the array substrate above according to the embodiments of the disclosure, the array substrate can further include other existing structural layers, and a repeated description thereof will be omitted here.

Figure 5:
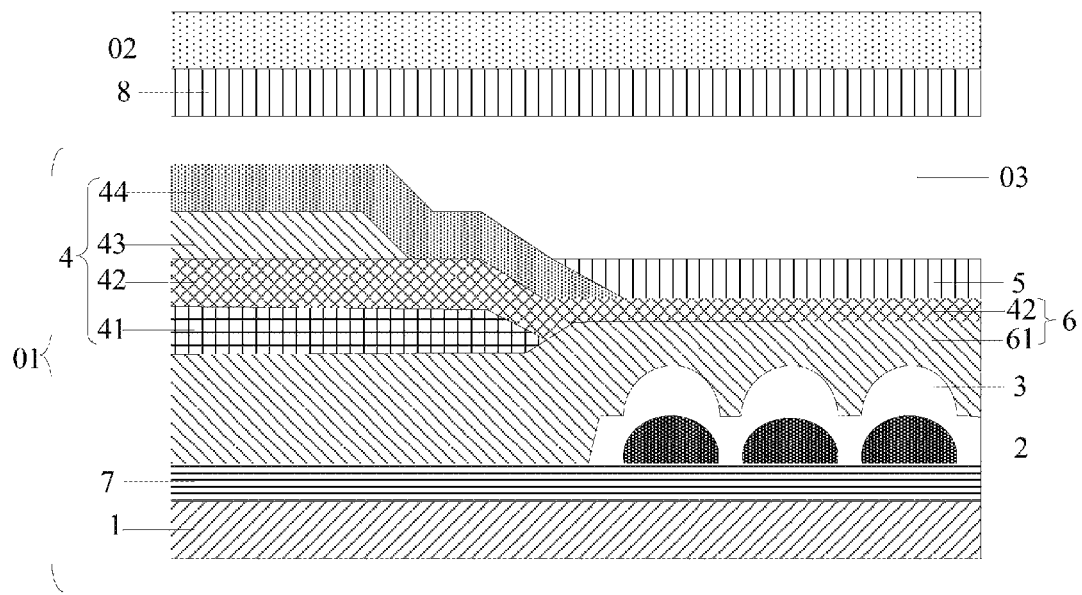
FIG. 5 is a schematic structural diagram of a liquid crystal display panel according to the embodiments of the disclosure in a sectional view.

Based upon the same inventive concept, the embodiments of the disclosure further provide a liquid crystal display panel as illustrated in FIG. 5, which includes the array substrate 01 above according to the embodiments of the disclosure, and further includes an opposite substrate 02, and a liquid crystal layer 03 located between the opposite substrate 02 and the array substrate 01. A common electrode layer 8 cooperating with the pixel electrode 5 to generate an electric field for controlling the liquid crystal layer 03 can be arranged on a side of the opposite substrate 02 facing the array substrate 01, or can be arranged on a side of the array substrate 01 facing the opposite substrate 02, although the embodiments of the disclosure will not be limited thereto.

Based upon the same inventive concept, the embodiments of the disclosure further provide a display device including the liquid crystal display panel above according to the embodiments of the disclosure. Particularly, the display device can be a smart phone, a liquid crystal television, a tablet computer, a Light Emitting Diode (LED) display screen, LCD, or any product with a display function.

Based upon the same inventive concept, the embodiments of the disclosure further provide a method for fabricating the array substrate above, where the method includes the following operations.

Forming a convex component on a base substrate.

Forming a reflection layer above the convex component.

Forming a thin film transistor above a film layer at which the reflection layer is located.

Forming a pixel electrode above a film layer at which the thin film transistor is located.

Forming a planarization layer after the reflection layer is formed, and before the pixel electrode is formed.

Optionally, in the method above according to the embodiments of the disclosure, forming the planarization layer includes forming a gate insulation layer of the thin film transistor, that is, the gate insulation layer is taken as a part of the planarization layer.

Optionally, in the method above according to the embodiments of the disclosure, forming the planarization layer further includes: forming a first insulation layer above the film layer at which the reflection layer is located, that is, the first insulation layer between the reflection layer and the thin film transistor is taken as another part of the planarization layer, and the first insulation layer overlaps with the gate insulation layer to constitute the planarization layer with such a thickness that can make the layer planar without affecting the planarity of the fabricated pixel electrode.

Optionally, in the method above according to the embodiments of the disclosure, forming the convex component on the base substrate includes: forming the convex component on the base substrate using a half-tone or gray tone mask.

Particularly, in order to provide a satisfactory height, e.g., 4000 angstroms, of the convex component, the convex component can be made in a plurality of layers of sub-convex component; and referring to FIG. 2, for example, each convex component 2 is fabricated in two components by firstly fabricating a first layer of sub-convex component 2a on a base layer using a Half-Tone Mask (HTM), and then stacking a second layer of sub-convex component 2b using the Half-Tone Mask (HTM) for fabricating the first layer of sub-convex component 2a.

Optionally, in the method above according to the embodiments of the disclosure, the reflection layer and the pixel electrode can be formed using the same mask.

Particularly, the reflection layer and the pixel electrode can be fabricated using the same mask without any additional mask; and can be fabricated in another area than the thin film transistor without hindering a pixel from being driven.

A method for fabricating an array substrate according to the embodiments of the disclosure will be described below with reference to FIG. 3 by way of an example.

Referring to FIG. 3, for example, the method for fabricating the array substrate according to the embodiments of the disclosure includes following operations.

The first operation is to fabricate a base layer 7 on a base substrate 1 as a base; or the base layer 7 may not be fabricated, but the base substrate 1 may be a base directly, that is, this operation can be omitted.

The second operation is to form a convex component 2 in a display area above the base layer 7 in an etching process using a first mask, where a height of the convex component 2 can be set as needed in reality.

The third operation is to fabricate a reflection layer 3 above the convex component 2 using a second mask.

The fourth operation is to fabricate a first insulation layer 61 above the reflection layer 3.

The fifth operation is to fabricate a gate 41, a gate insulation layer 42, an active layer 43, and a source-drain electrode 44 in that order in a non-display area above the first insulation layer 61.

The sixth operation is to form a pixel electrode 5 in the display area using the second mask.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. An array substrate, comprising:
   a base substrate;
   a convex component located on the base substrate;
   a reflection layer overlying the convex component;
   a thin film transistor located above the reflection layer;
   a pixel electrode located above the thin film transistor; and
   a planarization layer located between the pixel electrode and the reflection layer;
   wherein the convex component comprises a plurality of layers of sub-convex component arranged in a stack,
   an orthographic projection, of a first layer of sub-convex component, on the base substrate, covers an orthographic projection, of a second layer of sub-convex component, on the base substrate,
   the first layer is in direct contact with the base substrate, and the second layer is any layer of the plurality of layers of sub-convex component except the first layer;
   wherein the planarization layer comprises a gate insulation layer of the thin film transistor.

2. The array substrate according to claim 1, wherein the thin film transistor is a thin film transistor with a bottom gate.

3. The array substrate according to claim 2, wherein an orthographic projection of the reflection layer onto the base substrate overlaps with an orthographic projection of the pixel electrode onto the base substrate.

4. The array substrate according to claim 1, wherein an orthographic projection of the convex component onto the base substrate does not overlap with an orthographic projection of the thin film transistor onto the base substrate.

5. The array substrate according to claim 1, wherein a material of the convex component is a resin or a silicon nitride.

6. The array substrate according to claim 1, wherein the array substrate further comprises a base layer located between the convex component and the base substrate.

7. The array substrate according to claim 1, wherein the planarization layer further comprises a first insulation layer located between the thin film transistor and the reflection layer.

8. The array substrate according to claim 7, wherein a material of the gate insulation layer is same as a material of the first insulation layer.

9. The array substrate according to claim 1, wherein a height of the convex component ranges from 3000 to 4000 angstroms.

10. The array substrate according to claim 6, wherein a material of the base layer is same as a material of the convex component.

11. A liquid crystal display panel, comprising an array substrate; wherein the array substrate comprises:
    a base substrate;
    a convex component located on the base substrate;
    a reflection layer overlying the convex component;
    a thin film transistor located above the reflection layer;
    a pixel electrode located above the thin film transistor; and
    a planarization layer located between the pixel electrode and the reflection layer;
    wherein the convex component comprises a plurality of layers of sub-convex component arranged in a stack,
    an orthographic projection, of a first layer of sub-convex component, on the base substrate, covers an orthographic projection, of a second layer of sub-convex component, on the base substrate,
    the first layer is in direct contact with the base substrate, and the second layer is any layer of the plurality of layers of sub-convex component except the first layer;
    wherein the planarization layer comprises a gate insulation layer of the thin film transistor.

12. A display device, comprising the liquid crystal display panel according to claim 11.

13. The liquid crystal display panel according to claim 11, wherein the thin film transistor is a thin film transistor with a bottom gate; and
    an orthographic projection of the reflection layer onto the base substrate overlaps with an orthographic projection of the pixel electrode onto the base substrate.

14. The liquid crystal display panel according to claim 11, wherein an orthographic projection of the convex component onto the base substrate does not overlap with an orthographic projection of the thin film transistor onto the base substrate.

15. The liquid crystal display panel according to claim 11, wherein a height of the convex component ranges from 3000 to 4000 angstroms.

16. The liquid crystal display panel according to claim 11, wherein the array substrate further comprises a base layer located between the convex component and the base substrate.

17. The liquid crystal display panel according to claim 16, wherein a material of the base layer is same as a material of the convex component.

* * * * *